(12) United States Patent
Shinotsuka et al.

(10) Patent No.: US 6,191,408 B1
(45) Date of Patent: Feb. 20, 2001

(54) PHOTOSENSOR SIGNAL PROCESSING APPARATUS

(75) Inventors: Sukeyuki Shinotsuka; Katsuhiko Takebe, both of Wako; Toshiaki Tanaka; Toshio Imai, both of Tokorozawa, all of (JP)

(73) Assignee: Honda Giken Koygo Kabushiki Kaisha, Tokyo (JP)

( * ) Notice: Under 35 U.S.C. 154(b), the term of this patent shall be extended for 0 days.

(21) Appl. No.: 09/293,468

(22) Filed: Apr. 13, 1999

(30) Foreign Application Priority Data

Apr. 15, 1998 (JP) .................................................. 10-105131

(51) Int. Cl.$^7$ .................................................. H01L 31/14
(52) U.S. Cl. .................. 250/208.1; 250/214 C; 348/241
(58) Field of Search .................. 250/214 R, 214 AG, 250/214 C, 208.1, 208.2; 348/241, 243, 244, 245, 246, 247, 250

(56) References Cited

U.S. PATENT DOCUMENTS

| | | | |
|---|---|---|---|
| 3,949,162 | * | 4/1976 | Malueg ................................ 348/247 |
| 4,032,975 | * | 6/1977 | Malueg et al. ........................ 358/482 |
| 4,317,134 | * | 2/1982 | Woo et al. ............................ 348/250 |
| 5,317,407 | * | 5/1994 | Michon ................................ 348/306 |

FOREIGN PATENT DOCUMENTS

| | | |
|---|---|---|
| 54-32013 | 8/1977 | (JP) . |
| 3-178170 | 7/1991 | (JP) . |
| 8-239503 | 9/1996 | (JP) . |

* cited by examiner

*Primary Examiner*—John R. Lee
(74) *Attorney, Agent, or Firm*—Lyon & Lyon LLP

(57) ABSTRACT

A photosensor signal processing apparatus is used in combination with an image sensor comprised of a matrix of pixels or photosensors capable of producing an output as a linear function and a logarithmic function of incident illumination. The apparatus includes a correction data storage device which stores therein a set of data about the respective photosensors for the correction of individual outputs of the photosensors, and a correcting device for correcting the respective output values of the photosensors on the basis of the correction data. Thus, even when the individual outputs of the photosensors generate have different characteristics, the output characteristic variation between the photosensors are corrected such that the output characteristics of all the photosensors agree with a reference output characteristic. A fixed pattern noise resulting from the pixel-to-pixel output characteristic variation can be suppressed.

11 Claims, 9 Drawing Sheets

PHOTOSENSOR SIGNAL PROCESSING APPARATUS

BACKGROUND OF THE INVENTION

1. Field of the Invention

The present invention relates generally to a photosensor signal processing apparatus for suppressing a fixed pattern noise resulting from variations (unevenness) in characteristics of pixels of a metal-oxide-semiconductor (MOS) image sensor. More particularly, it relates to a photosensor signal processing apparatus for correcting the output of a MOS image sensor having an inflection point at which the output of each pixel changes from a linear function to a logarithmic function of incident illumination, and vice versa.

2. Description of the Related Art

In order to suppress a fixed pattern noise resulting from variations (unevenness) in characteristics of pixels of a MOS image sensor, one conventional approach has been directed toward improvements in the device fabrication process such that all of the pixel-forming devices of the MOS image sensor have uniform output characteristics.

In another conventional approach, a measurement is made in advance to determine characteristics of a pattern noise of the MOS image sensor. The fixed pattern noise is suppressed through a correction made subsequently on the basis of the predetermined pattern noise characteristics.

Japanese Patent Publication No. SHO 61-14702 discloses a method of correcting output variations between pixels of an image sensor. The output of this image sensor varies linearly with incident illumination. To correct the pixel-to-pixel output variation of the image sensor, individual output values "Did" from the pixels in a dark state and individual output values "Diw" from the same pixels in a bright state under uniform illumination are previously stored in a memory. An output value "D1" of each pixel, which is produced in response to light and shade of an image picked up by the image sensor, is corrected by arithmetic operation achieved in accordance with the formula: A(Di−Did)/Diw−Did) where A is a constant. With this arithmetic operation, the pixel-to-pixel output variation in the dark state and the pixel-to-pixel sensitivity variation (variations in the gradients of linear output characteristic curves) are corrected.

A solid-state imaging system disclosed in Japanese Patent Laid-open Publication No. HEI 5-30350 includes a charge-coupled device (CCD) having a mosaic of tiny pixels whose outputs vary logarithmically with incident illumination. To correct the pixel-to-pixel output variation, individual imaging data of the pixels are previously collected under uniform illumination, then stored in a memory. These pre-stored imaging data are subtracted pixel by pixel from individual imaging data of the pixels collected during actual imaging operation. With this subtracting operation, the pixel-to-pixel logarithmic output characteristic variation is corrected.

The output variation correcting method disclosed in the first-mentioned Japanese Publication cannot deal with the correction of variations in output of pixels having a logarithmic property. The solid-state imaging system shown in the second-mentioned Japanese Publication can achieve correction of the pixel-to-pixel logarithmic output characteristic variation. However, due to the subtracting operation, the intensity of corrected sensor output of the imaging system is lower than that of sensor output corresponding to actual incident illumination. The sensitivity of the overall imaging system goes down, accordingly.

Japanese Patent Laid-open Publication No. HEI 10-90058 discloses a MOS image sensor designed to produce a sensor output having both a linear function region and a logarithmic function region with respect to incident illumination. A problem associated with this known MOS image sensor is that at an inflecting point where the sensor output changes from the linear function to the logarithmic function, and vice versa, an output error resulting from the pixel-to-pixel characteristic variation (variations in characteristic of MOS transistors and photodiodes forming the pixels) is likely to increase.

SUMMARY OF THE INVENTION

It is accordingly an object of the present invention to provide a photosensor signal processing apparatus which can correct variations in characteristics between pixels of an image sensor having an inflection point at which the sensor output changes from a linear function to a logarithmic function of incident illumination.

According to the invention, there is provided a photosensor signal processing apparatus for suppressing a fixed pattern noise resulting from variations in output characteristics between photosensors of an image sensor, each of the photosensors having a linear function region in which sensor output varies linearly with incident illumination, and a logarithmic function region in which the sensor output varies logarithmically with incident illumination. The photosensor signal processing apparatus comprises a correction data storage device which stores a set of correction data about the respective photosensors for the correction of individual output values of the photosensors, and a correcting device for correcting each of the individual output values of the photosensors on the basis of a corresponding one of the set of correction data, so that the output values of the photosensors equal to one another.

With this arrangement, variations of the output characteristics between the photosensors are corrected such that all the photosensors have the same output characteristics which are identical to a standard output characteristic. Thus, a fixed pattern noise resulting from the pixel-to-pixel output characteristic variation can be suppressed.

In one preferred form of the invention, the correction data storage device includes a reference inflection point setting device for setting data about a reference inflection point between the linear function region and the logarithmic function region, and an inflection point data storage device which stores therein a set of data about individual inflection points of the photosensors. The correcting device includes an inflection point corrective calculation device for performing at least one corrective calculation on the basis of the reference inflection point data and the set of inflection point data so that the individual inflection points of the photosensors match with the reference inflection point. The reference inflection point setting device can set the reference inflection point data at any given value. The output characteristic at the inflection point of the photosensors can, therefore, be adjusted.

In another preferred form of the invention, the correction data storage device includes a reference offset data storage device which stores therein data about a reference offset common to all of the photosensors, and an offset data storage device which stores therein a set of data about individual offsets of the photosensors. The correcting device includes an offset corrective calculation device for performing at least one corrective calculation on the basis of the reference offset data and the set of offset data so that the individual offsets of the photosensors match with the reference offset. Thus, the pixel-to-pixel offset characteristic variation can be corrected.

Preferably, the photosensor signal processing apparatus further includes a linear characteristic correcting unit for correcting individual sensor outputs of the photosensors based on the reference offset data and the reference inflection point data so that within the linear function region, the individual sensor outputs have the same linear characteristics. Thus, the pixel-to-pixel output characteristic variation within the linear function region can be corrected.

It is preferable that the photosensor signal processing apparatus further includes a logarithmic characteristic correcting unit for correcting individual sensor outputs of the photosensors based on the reference inflection point data and data about a reference output at a given point within the logarithmic function region so that within the logarithmic function region, the individual sensor outputs have the same logarithmic characteristics. Thus, the pixel-to-pixel output characteristic variation within the logarithmic function region can be corrected.

The correction data storage device may further include a load correction coefficient storage section which stores therein individual load correction coefficients of the photosensors. In this case, the correcting device corrects each of the individual output values of the photosensors on the basis of a corresponding one of the load correction coefficients, so that variations in output characteristic between the photosensors which may occur due to variations in load of the photosensors are corrected.

Additionally, the correction data storage device may include a temperature correction coefficient storage section which stores therein individual temperature correction coefficients of the photosensors. In this case, the correcting device corrects each of the individual output values of the photosensors on the basis of a corresponding one of the temperature correction coefficients, so that variations in output characteristic between the photosensors which may occur due to variations in temperature of the photosensors are compensated.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

Certain preferred embodiments of the present invention will be described in greater detail with reference to the accompanying drawings.

Figure 1:
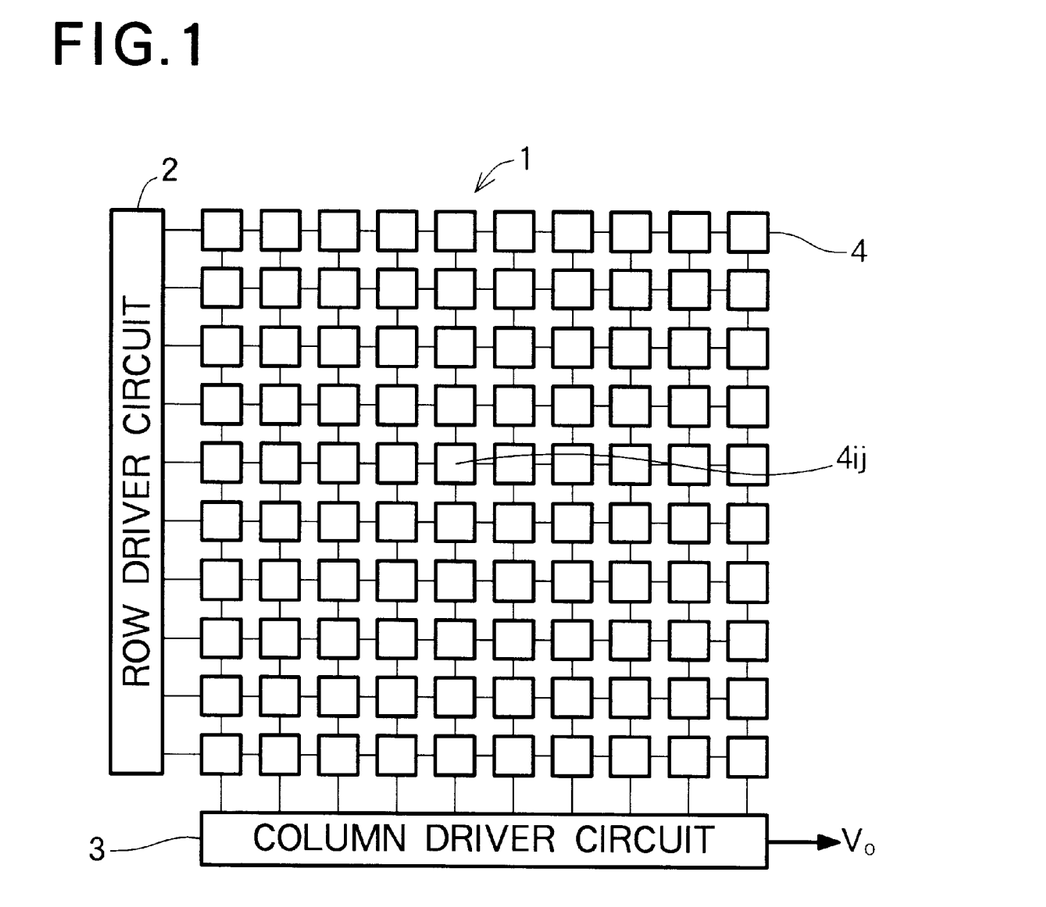
FIG. 1 is a diagrammatical view showing the general arrangement of a MOS image sensor with which a photosensor signal processing apparatus according to the present invention is used.

Referring now to FIG. 1, there is shown a MOS image sensor 1 with which a photosensor signal processing apparatus of the present invention is used.

The MOS image sensor 1 is comprised of a multiplicity of pixels (photosensors) 4 arranged in a rectangular array or matrix, a row driver circuit 2 for selectively driving pixels in each row of the pixel arra, and a column driver circuit 3 for selectively driving pixels 4 in each column of the pixel array.

The column driver circuit 3 includes an interface circuit (not shown) from which individual sensor outputs Vo of the pixels 4 are output. In FIG. 1 reference character 4$ij$ denotes one of the pixels 4 selected at random.

Figure 2:
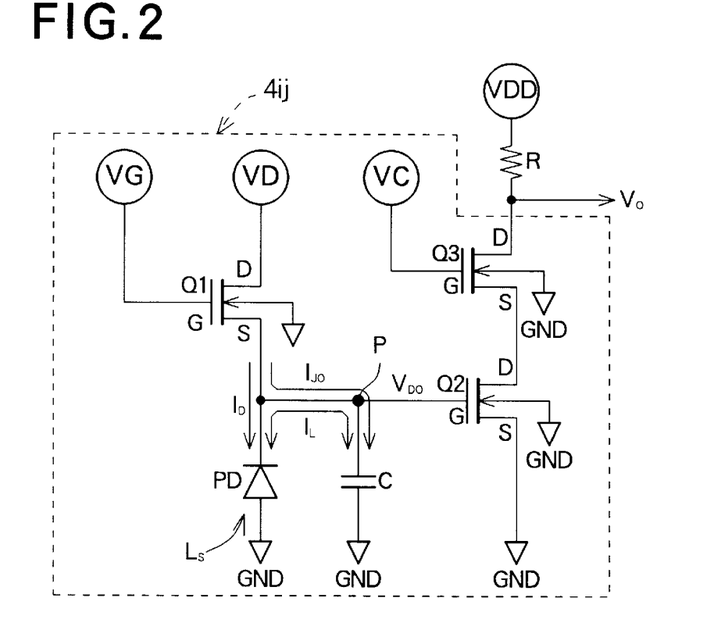
FIG. 2 is a circuit diagram of a pixel (photosensor) of the MOS image sensor.

As shown in FIG. 2, the pixel (photosensor) 4$ij$ includes a photodiode PD, an n-channel MOS transistor Q1 connected in series with the photodiode PD, an n-channel MOS transistor Q2 connected at a gate to a junction (sensor detection terminal) P between the photodiode PD and the n-channel MOS transistor Q1, and an n-channel MOS transistor Q3 connected in series with the n-channel MOS transistor Q2. A load resistance R is connected to a drain of the n-channel MOS transistor Q2.

A capacitance C is connected to the junction P. This capacitance C is an equivalent capacitance comprising a synthesized stray capacitance caused by relative proximity of the photodiode PD, n-channel MOS transistor Q1, n-channel MOS transistor Q2 and wires interconnecting these components PD, Q1, Q2, or a capacitor formed during the semiconductor fabrication process.

The photodiode PD detects incident illumination Ls and converts it into electric current signals (sensor current) ID of an intensity which is proportional to the incident illumination.

The n-channel MOS transistor Q1 forms a load of the photodiode PD. Thus, this transistor Q1 converts the sensor current ID into a voltage so that a detection voltage VDO is developed at the sensor detection terminal P.

The n-channel MOS transistor Q2 forms an output transistor. This transistor Q2 performs voltage-to-current conversion so that the detection voltage $V_{DO}$ can be taken out from the photosensor 4$ij$ in the form of a sensor current signal. The n-channel MOS transistor Q3 forms a switch which operates to selectively make and break the connection between the transistor Q2 and an external circuit (not shown). By the switching operation of the transistor Q3, the sensor current signal generated by the transistor Q2 is selectively supplied to the external circuit.

The load resistance R converts the sensor current signal that is generated by the transistor Q2 into a voltage signal and produces the voltage signal as a sensor output $V_O$.

Figure 3:
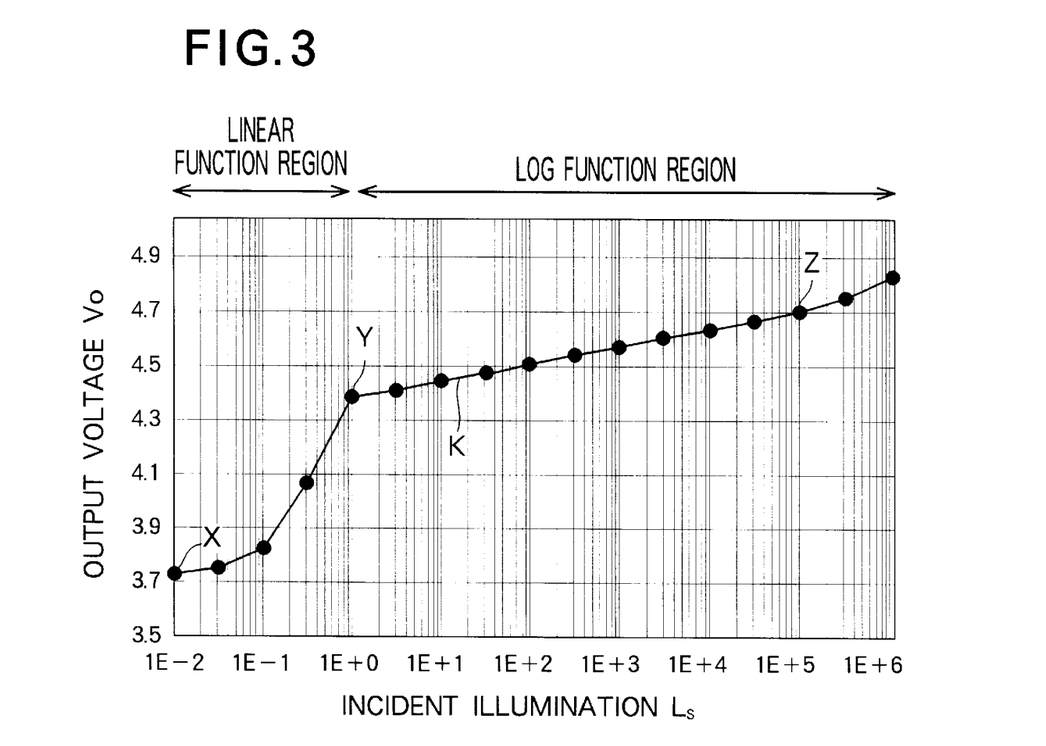
FIG. 3 is a graph showing the output characteristic of the photosensor of FIG. 2 with respect to the illumination of incident light.

Individual sensor outputs (output voltages) $V_O$ of the photosensors (pixels) 4 have a characteristic which is represented by an output voltage versus incident illumination characteristic curve K shown in FIG. 3. In FIG. 3, the vertical axis indicates the sensor output (output voltage) $V_O$, and the horizontal axis indicates, on logarithmic scale, the incident illumination $L_S$.

The characteristic curve K clearly indicates that in a dark state where the incident illumination $L_S$ is very small, the output voltage $V_O$ is very low as at a point X, and from this point X the output voltage $V_O$ increases linearly with an increase in the incident illumination.

Continuing increase in the incident illumination $L_S$ causes the output voltage $V_O$ to reach an inflection point Y at which the output voltage $V_O$ changes its nature from a linear function to a logarithmic function of the incident illumination $L_S$ and vice versa. As the incident illumination $L_S$ is further increased, the output voltage $V_O$ increases logarithmically with respect to the incident illumination $L_S$. In FIG. 3, a point Z shows the output voltage $V_O$ at an arbitrarily selected point in the logarithmic function region of the photosensor which is corresponding to the incident illumination $L_S$ of 1E+5 (=100,000).

The sensor output characteristic curve K shown in FIG. 3 represents a reference sensor output characteristic for the photosensors (pixels) 4. In the MOS image sensor 1 shown in FIG. 1, the individual photosensors 4 generate different sensor outputs (output voltages) $V_O$ with respect to the same incident illumination $L_S$. Variations in sensor output between the photosensors 4 contains the offset variation occurring in the dark state as at the point X, the inflection point variation occurring at the point Y, and the variation caused by variations in load.

Now, description is given of a photosensor signal processing apparatus of the present invention which is designed to correct the foregoing variations such that individual sensor outputs of the photosensors 4 are coincident with the reference sensor output represented by the characteristic curve K shown in FIG. 3.

Figure 4:
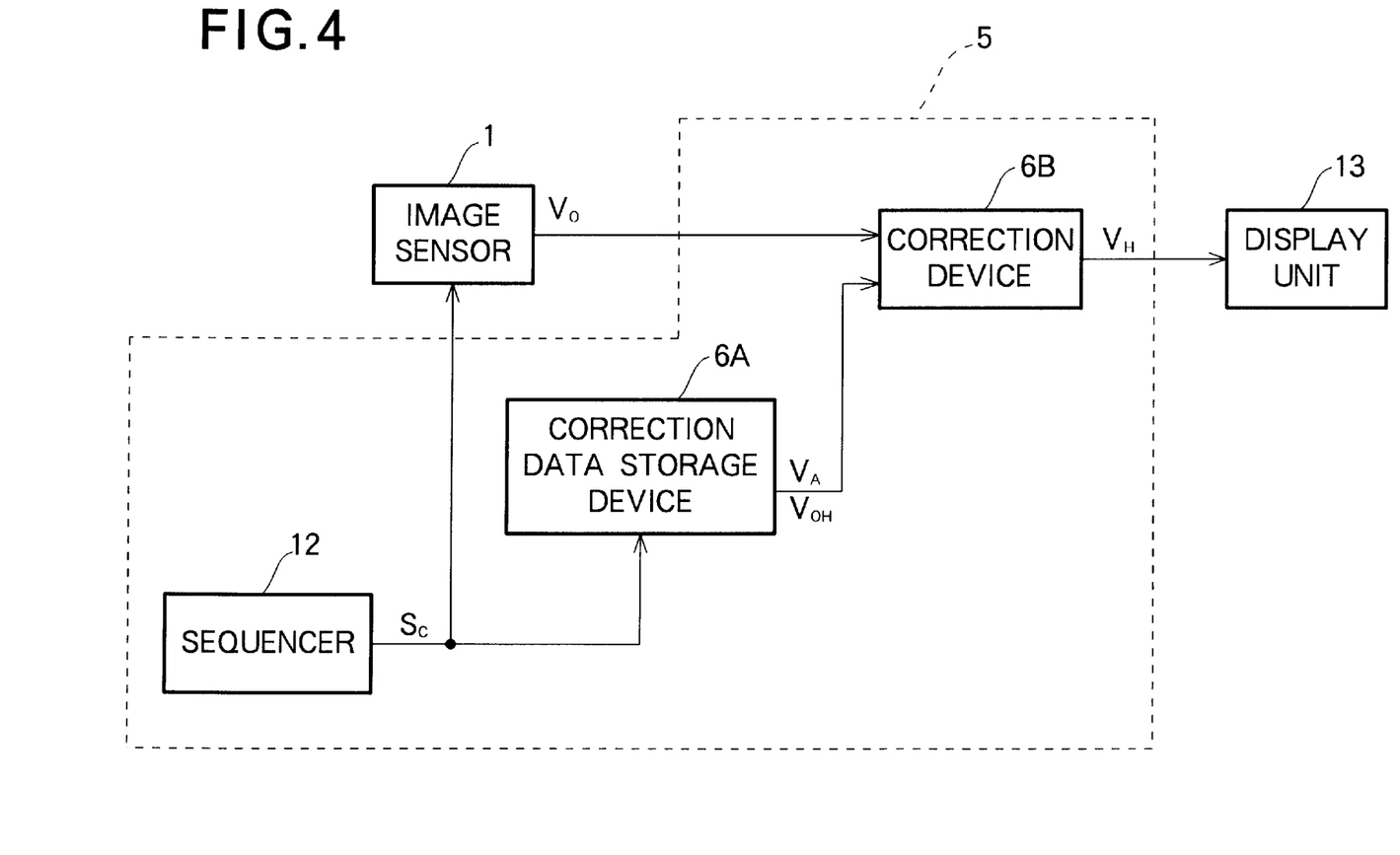
FIG. 4 is a block diagram showing the general arrangement of a photosensor signal processing apparatus according to one embodiment of the present invention.

As shown in FIG. 4, the photosensor signal processing apparatus 5 used in combination with a MOS image sensor 1 includes a correction data storage device 6A, a correcting device 6B, and a sequencer 12. The MOS image sensor 1 corresponds to the MOS image sensor 1 previously described with reference to FIGS. 1–3. A display unit 13 is externally connected to the photosensor signal processing apparatus 5. A sensor signal detected by the MOS image sensor 1 is displayed as an image on the display unit 13 on the basis of a sensor output $V_H$ having an inflection point corrected by the photosensor signal processing apparatus 5.

The image sensor 1 is designed to convert incident illumination into an electric signal of an intensity corresponding to the illumination of incident light, then supplying the electric signal, in the form of an output voltage $V_O$, to the correcting device 6B in accordance with a sequence signal $S_C$ supplied from the sequencer 12.

The correction data storage device 6A is formed by a read/write memory, such as a RAM (random access memory). This device 6A pre-stores a set of data about individual outputs (output voltages $V_O$ shown in FIG. 3) of the photosensors 4 forming the image sensor 1 and data about a standard output required for the image sensor 1.

In synchronism with the sequence signal $S_C$ supplied from the sequencer 12, the individual output data $V_A$ of the photosensors 4$ij$ and the standard output data $V_{OH}$ are retrieved from the correction data storage device 6A and supplies to the correcting device 6$b$.

The correcting device 6B is formed by an operating circuit such as a subtractor or a divider. This device 6B operates to calculate a correction value on the basis of the output data $V_A$ and standard data $V_{OH}$ supplied from the correction data storage device 6A, to perform correction of an actual output voltage $V_O$ supplied from the image sensor 1 by use of the correction value, and to output the corrected output voltage to the display unit 13 in the form of a sensor output $V_H$.

In sum, the photosensor signal processing apparatus 5 is used with an image sensor 1 composed of a multiplicity of photosensors 4 each having an output characteristic which has a linear function region in which the sensor output varies linearly with incident illumination, and a logarithmic function region in which the sensor output varies logarithmically with incident illumination. The apparatus 5 includes a correction data storage device 6A which stores a set of correction data about the photosensors for the correction of individual output values of the photosensors, and a correcting device 6B for correcting the individual output values of the photosensors on the basis of the correction data. Even when individual output characteristics of the photosensors 4 vary from one another, the photosensor signal processing apparatus 5 can correct the variations in output characteristic so that the output characteristics of all the photosensors are identical with the standard sensor output characteristic.

Figure 5:
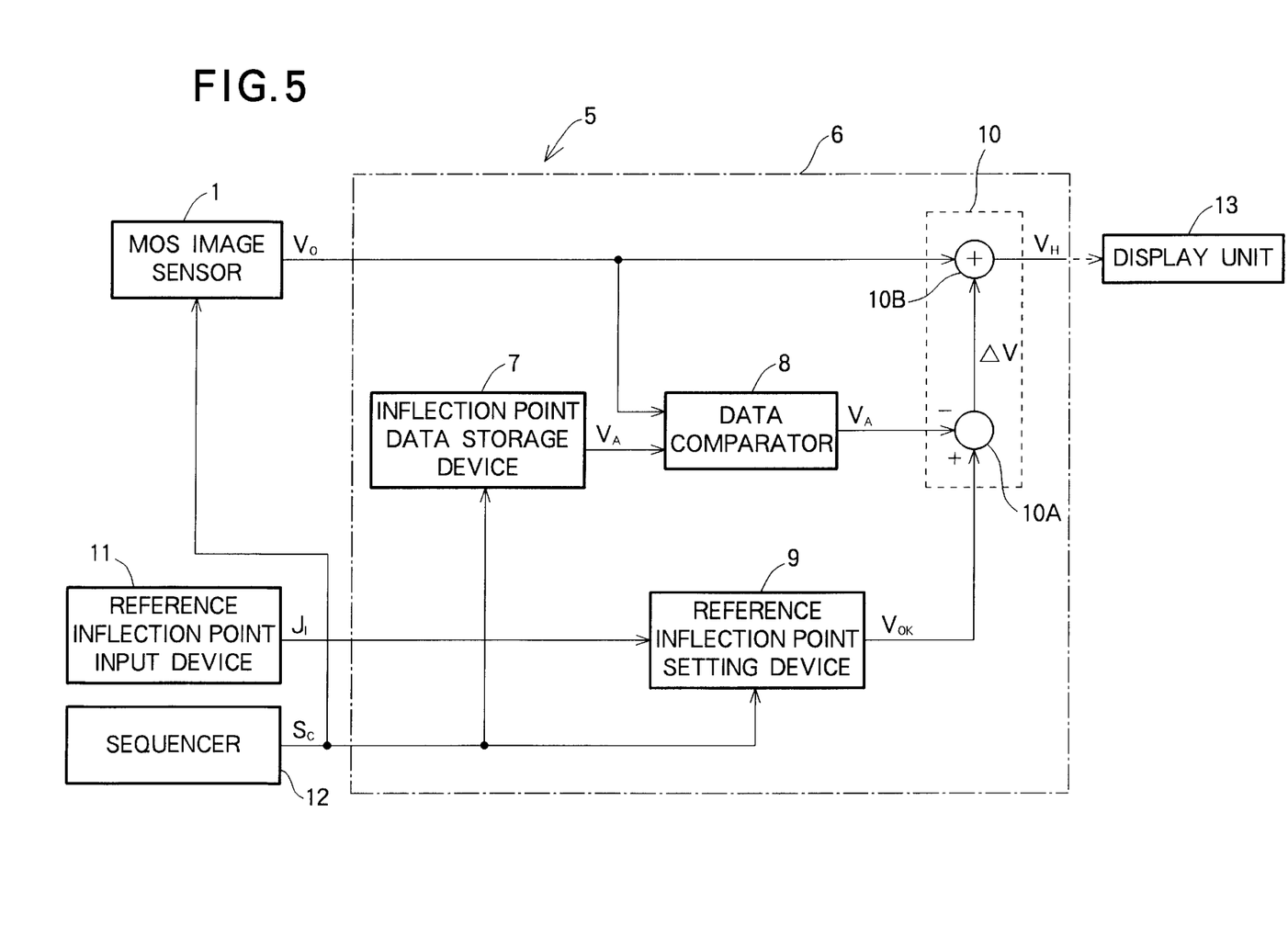
FIG. 5 is a block diagram showing the general arrangement of a photosensor signal processing apparatus including an inflection point correcting device according to another embodiment of the present invention.

A modified form of the photosensor signal processing apparatus shown in FIG. 5 is designed to correct variations in inflection point at which the sensor output of each photosensor changes from a linear function to a logarithmic function of incident illumination, and vice versa. This correction is effective to suppress a fixed pattern noise resulting from the inflection point variation of the photosensors and insures formation of a clear image.

As shown in FIG. 5, the modified photosensor signal processing apparatus 5 used with a MOS image sensor 1 includes a correcting device 6, a reference inflection point input device 11 and a sequencer 12. The MOS image sensor 1 is the same as the image sensor 1 described above with reference to FIGS. 1–3.

The correcting device 6 includes an inflection point data storage device 7, a data comparator 8, a reference inflection point data setting device 9, and an inflection point corrective calculation device 10. The correcting device 6 is designed to first achieve a comparison between data about a preset reference inflection point and data about an actual inflection point of each individual photosensor 4 of the MOS image sensor 1, then perform a correction so as to make the actual inflection point data coincident with the reference inflection point data.

In the correcting device 6, the inflection point data storage device 7 and the reference inflection point data setting device 9 correspond to the correction data storage unit 6A of FIG. 4, and the data comparator 8 and the inflection point corrective calculation device 10 correspond to the correcting device 6B of FIG. 4.

The inflection point data storage device 7 is formed by a memory such as a ROM (read-only memory) and stores a set of data $V_A$ about individual inflection points of the photosensors 4 (FIG. 1) collected in advance by measurements. In accordance with a sequence signal $S_C$ supplied from the sequencer 12, the inflection point data $V_A$ corresponding to each photosensor is retrieved from the inflection point data storage device 7, then supplied to the data comparator 8.

The data comparator 8 has a comparator circuit or the function of a software-controlled comparator. The data comparator 8 compares a sensor output $V_O$ of each photosensor 4 (FIG. 1) of the image sensor 1 and inflection point data $V_A$ of a corresponding one of the photosensors retrieved from the inflection data storage device 7. If the sensor output $V_O$ is coincident with the inflection point data $V_A$ ($V_O=V_A$), the data comparator 8 judges the sensor output $V_O$ to be inflection point data and supplies the inflection point data $V_A$ to the inflection point corrective calculation device 10.

The reference inflection point data setting device 9 is formed by a read/write memory such as a RAM and stores reference inflection point data $V_{OK}$ which is input in advance from the reference inflection point input device 11. In accordance with the sequence signal $S_C$ supplied from the sequencer 12, the reference inflection point data $V_{OK}$ is retrieved from the reference inflection point data setting device 9, then supplied to the inflection point corrective calculation device 10.

The reference inflection point data $V_{OK}$ is set at either a mean value of the inflection point data of all the photosensors 4 (FIG. 1) of the MOS image sensor 1, or alternatively a theoretically determined design standard value.

The inflection point corrective calculation device 10 is composed of a subtractor 10A and an adder 10B.

The subtractor 10A calculates an offset between inflection point data $V_A$ of each of the photosensors supplied from the data comparator 8 and the reference inflection point data $V_{OK}$ supplied from the reference inflection point data setting device 9. A result of this subtraction ($V_{OK}-V_A$) is supplied from the subtractor 10A to the adder 10B in the form of an offset signal $\ddot{A}V$.

The adder 10B adds the sensor output $V_O$ supplied from the MOS image sensor 1 and the offset signal $\ddot{A}V$ supplied from the subtractor 10A, then outputting a result of this addition ($V_O+\ddot{A}V$) to the external display unit 13 in the form of a sensor correction output $V_H$.

In this instance, because each sensor output $V_O$ is coincident with the corresponding inflection point data $V_A$ ($V_O=V_A$), the sensor correction output $V_H$ is coincident with the reference inflection point data $V_{OK}$ ($V_H=V_{OK}$). This means that the inflection point data $V_A$ of all the photosensor are corrected into the reference inflection point data $V_{OK}$.

The reference inflection point input device 11 is a data input device such as a keyboard and supplies input information $J_I$ corresponding to the reference inflection point data $V_{OK}$ to the reference inflection point data setting device 9. Thus, depending on the input information $J_I$ supplied from the reference inflection point input device 11, the reference inflection point data setting device 9 can set the reference inflection point data $V_{OK}$ at any desired value, thereby altering the output characteristic of the MOS image sensor 1.

The sequencer 12 is formed by a timing pulse generator and generates a sequence signal $S_C$ which is supplied to the MOS image sensor to activate a selected one of the photosensors 4 (FIG. 1). The sequence signal $S_C$ is also supplied to the inflection point data storage device 7 to retrieve therefrom inflection point data $V_A$ corresponding to the selected photosensor. Thus, in synchronism with activation of the selected photosensor, the sequence signal $S_C$ is also supplied to the reference inflection point data setting device 9 to retrieve therefrom the reference inflection point data $V_{OK}$.

Because the correcting device 6 includes a reference inflection point setting device 9 for setting reference inflection data $V_{OK}$ common to all the photosensors of the MOS image sensor 1, an inflection point data storage device 7 storing therein a set of inflection point data $V_A$ of the photosensors, and an inflection point corrective calculation device 10, the photosensor signal processing apparatus 5 shown in FIG. 5 can correct the inflection point data $V_A$ of each photosensor on the basis of the reference inflection point data $V_{OK}$ so that they are identical with each other.

Figure 6:
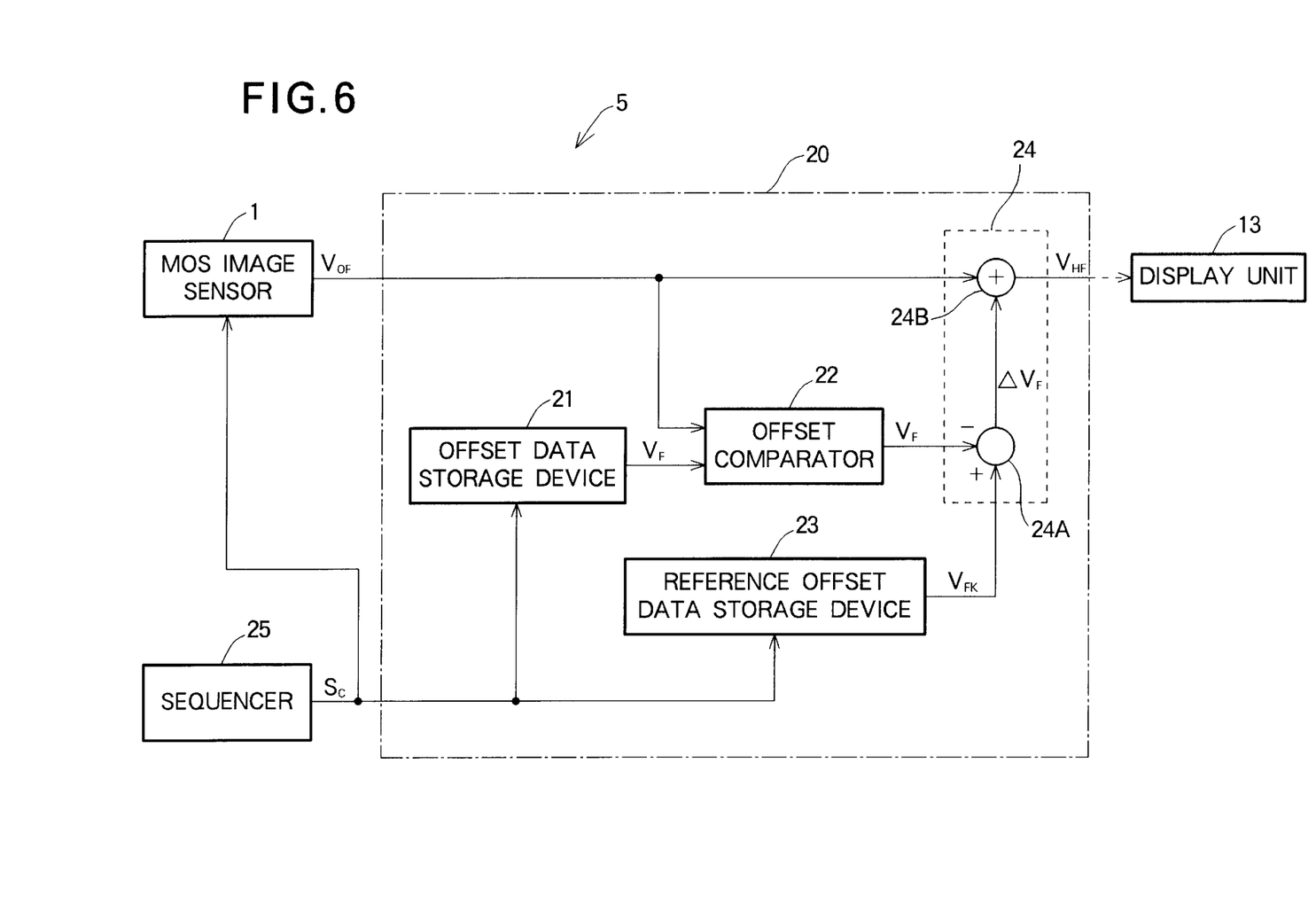
FIG. 6 is a block diagram showing the general arrangement of a photosensor signal processing apparatus including an offset correcting device according to still another embodiment of the present invention.

FIG. 6 shows another modification of the photosensor signal processing apparatus 5 according to the present invention. The modified photosensor signal processing apparatus, also denoted by reference numeral 10, is designed to correct the offset variation occurring at the point X shown in FIG. 3.

As shown in FIG. 6, the photosensor signal processing apparatus 5 used in combination with a MOS image sensor 1 includes a correcting device 20 and a sequencer 12. The MOS image sensor 1 is the same as the image sensor 1 described above with reference to FIGS. 1–3. Furthermore, the MOS image sensor 1 and the sequencer 12 are structurally and operationally the same as those 1 and 12 of the foregoing embodiment shown in FIG. 5, and further description thereof can, therefore, be omitted.

The correcting device 20 includes an offset data storage device 21, an offset comparator 22, a reference offset data storage device 23, and an offset corrective calculation device 24. The correcting device 20 is designed to first achieve comparison between data $V_{FK}$ about a preset reference offset and data $V_F$ about an actual offset of each individual photosensor 4 (FIG. 1) of the MOS image sensor 1, then perform correction such that the actual offset data $V_F$ are made equal to the reference offset data $V_{FK}$.

In the correcting device 20, the offset data storage device 21 and the reference offset data storage device 23 correspond to the correction data storage unit 6A of FIG. 4, and the offset comparator 22 and the offset corrective calculation device 24 correspond to the correcting device 6B of FIG. 4.

The offset data storage device 21 is formed by a memory such as a ROM and stores a set of offset data $V_F$ of the photosensors 4 collected in advancer by measurement. In accordance with a sequence signal $S_C$ supplied from the sequencer 12, the offset data $V_F$ corresponding to each photosensors is retrieved from the offset data storage device 21, then supplied to the offset comparator 22.

The offset comparator 22 is formed by a comparator circuit or a software-controlled comparator. The offset comparator 22 compares a sensor output $V_{OF}$ of each photosensor 4 (FIG. 1) of the image sensor 1 and offset data $V_F$ of a corresponding one of the photosensors supplied from the offset data storage device 21. If the sensor output $V_{OF}$ is coincident with the offset data $V_F$ ($V_{OF}=V_F$), the offset comparator 22 judges the sensor output $V_{OF}$ to be offset data and supplies the offset data $V_F$ to the offset corrective calculation device 24.

The reference offset data storage device 23 is formed by a read/write memory such as a RAM and stores reference offset data $V_{FK}$ which is input in advance. In accordance with the sequence signal Sc supplied from the sequencer 12, the reference offset data VFK is retrieved from the reference offset data storage device 23, then supplied to the offset corrective calculation device 24.

The reference offset data VFK is set at either a mean value of the offset data of all the photosensors 4 (FIG. 1) of the MOS image sensor 1, or alternatively a theoretically determined design standard value.

The offset corrective calculation device 24 is formed by a subtractor 24A and an adder 24B.

The subtractror 24A calculates an offset between offset data VF of each of the photosensors supplied from the offset comparator 22 and the reference offset data VFK supplied from the reference offset data storage device 23. A result of this subtraction (VFK−VF) is supplied from the subtractor 24A to the adder 24B in the form of an offset signal ÄVF.

The adder 24B adds the sensor output VOF supplied from the MOS image sensor 1 and the offset signal ÄVF supplied from the subtractor 24A, then outputting a result of this addition (VOF+ÄVF) to an external display unit 13 in the form of a sensor correction output VHF.

In this instance, because each sensor output VOF is coincident with the corresponding offset data VF (VOF=VF), the sensor correction output VOF is coincident with the reference offset data VFK (VOF=VFK). This means that the offset data VF of all the photosensors are corrected into the reference offset data VFK.

Because the correcting device 20 includes a reference offset setting device 23 for setting reference inflection data VFK common to all the photosensors of the MOS image sensor 1 held in a dark state in which incident illumination is small, an offset data storage device 21 holding therein a set of offset data VF of the photosensors, and an offset corrective calculation device 24, the photosensor signal processing apparatus 5 shown in FIG. 6 can correct the offset data VF of each photosensor on the basis of the reference offset data VFK.

Figure 7:
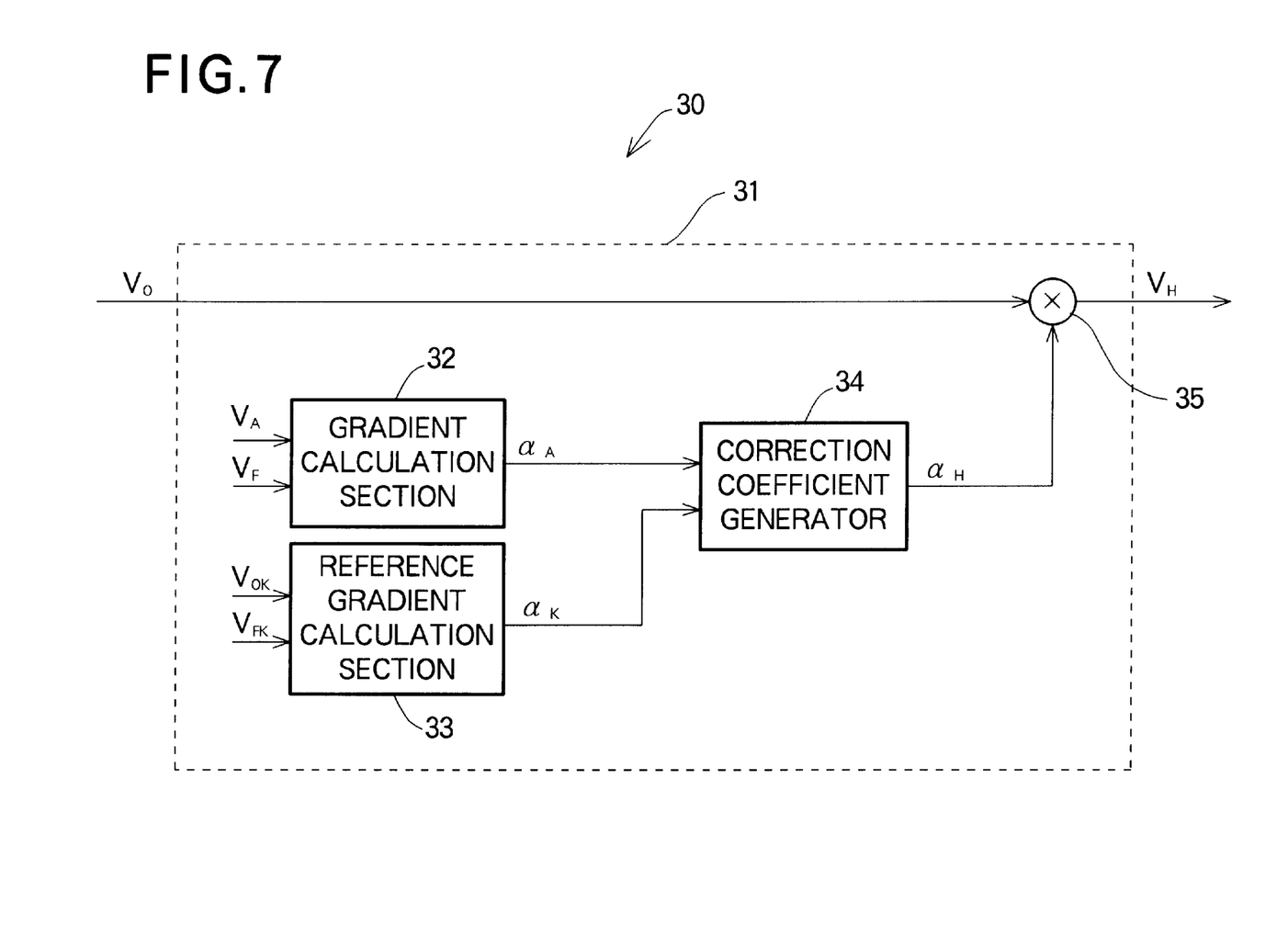
FIG. 7 is a block diagram showing a linear characteristic correcting device which can be incorporated in the photosensor signal processing apparatuses shown in FIGS. 4–6.

FIG. 7 shows in block diagram a modified correcting device 30 including a linear characteristic correcting means or unit 31.

The linear characteristic correcting unit 31 includes a gradient calculation means or section 32, a reference gradient calculation means or section 33, a correction coefficient generating means or generator 34 and a corrective calculation means or section 35.

The gradient calculation section 32 is formed by a subtractor and a divider. This section 32 is designed to calculate the ratio of the difference between the inflection point data VA shown in FIG. 5 and the offset data VF shown in FIG. 6 to the difference between a first incident illumination Ls (FIG. 3) corresponding to the inflection point data VA and a second incident illumination Ls (FIG. 3) corresponding to the offset data VF. The calculated ratio is supplied to the correction coefficient generator 34 in the form of a gradient signal áA. The gradient signal áA represents a gradient or slope of the sensor output characteristic curve K (FIG. 3) within the linear function region of each photosensor 4 (FIG. 1) of the MOS image sensor 1.

Similarly, the reference gradient calculation section 33 is formed by a subtractor and a divider. This section 33 is designed to calculate the ratio of the difference between the reference inflection point data VOK shown in FIG. 5 and the reference offset data VFK shown in FIG. 6 to the difference between a first incident illumination Ls (FIG. 3) corresponding to the reference inflection point data VOK and a second incident illumination Ls (FIG. 3) corresponding to the reference offset data VFK. The calculated ratio is supplied to the correction coefficient generator 34 in the form of a reference gradient signal áK. The reference gradient signal áK represents a reference gradient or slope of the sensor output characteristic curve K (FIG. 3) within the linear function region which is common to all the photosensors 4 (FIG. 1) of the MOS image sensor 1.

The correction coefficient generator 34 has the function of a divider and is designed to calculate the ratio between the reference gradient signal áA supplied from the reference gradient calculation section 33 and the gradient signal áA supplied from the gradient calculation section 32. The calculated ratio (áK/áA) is supplied to the corrective calculation section 35 in the form of a correction coefficient signal áH.

The corrective calculation section 35 has the function of a multiplier and is designed to multiply the sensor output Vo supplied from each photosensor of the MOS image sensor 1 with the correction coefficient áH. A result of this multiplication (Vo×áH) is output from the corrective calculation section 35 in the form of a sensor correction output VH.

Because of the correcting device 30 including the linear characteristic correction unit 31 arranged to correct the linear characteristic of each photosensor on the basis of the offset data VFK and the reference inflection point data VOK, the photosensor signal processing apparatus can correct the sensor output such that the linear function region, the individual sensor outputs of the photosenosrs 4 (FIG. 1) forming the MOS image sensor 1 are the same as the reference sensor output characteristic.

Figure 8:
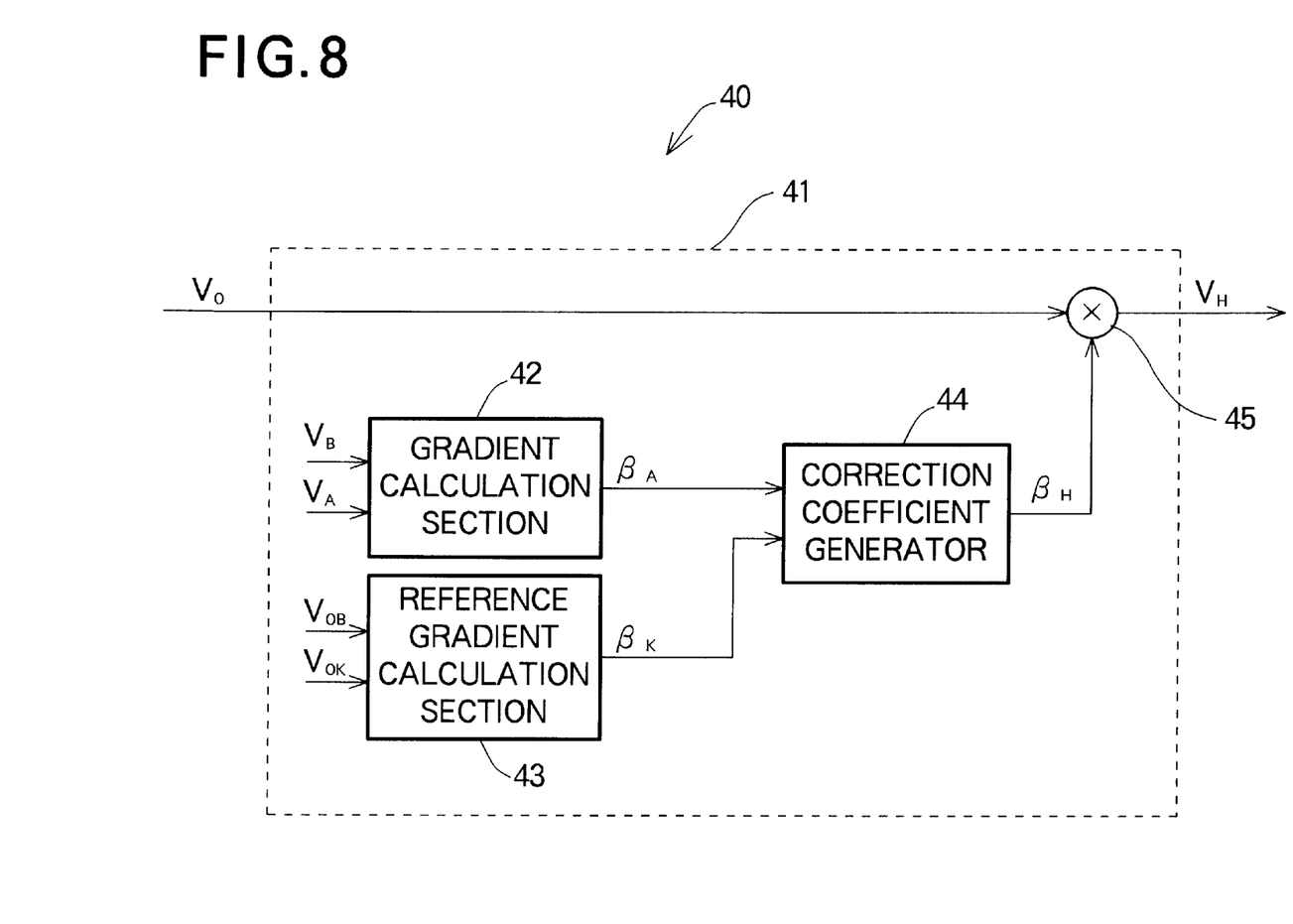
FIG. 8 is a block diagram showing a logarithmic characteristic correcting device which can be incorporated in the photosensor signal processing apparatuses shown in FIGS. 4–6.

FIG. 8 shows in block diagram a modified correcting device 40 including a logarithmic characteristic correcting means or unit 41.

The logarithmic characteristic correcting unit 41 includes a gradient calculation means or section 42, a reference gradient calculation means or section 43, a correction coefficient generating means or generator 44 and a corrective calculation means or section 45.

The gradient calculation section 42 has the functions of a subtractor and a divider. This section 32 is designed to calculate the ratio of the difference between the sensor output VB at a given incident illumination Ls (Ls=1E+5, for example) in the logarithmic function region (FIG. 3) of each photosensor 4 (FIG. 1) and the inflection point data VA shown in FIG. 5 to the difference between the given incident illumination Ls (1E+5) and the incident illumination corresponding to the inflection point data VA. The calculated ratio is supplied to the correction coefficient generator 44 in the form of a gradient signal âA. The gradient signal âA represents a gradient or slope of the sensor output characteristic curve K (FIG. 3) within the logarithmic function region of each photosensor 4 (FIG. 1) of the MOS image sensor 1.

Similarly, the reference gradient calculation section 43 has the functions of a subtractor and a divider. This section 43 is designed to calculate the ratio of the difference between the reference sensor output VOB at the given incident illumination Ls (1E+5) within the logarithmic function region (FIG. 3) of each photosensor 4 (FIG. 1) and the reference inflection point data VOK shown in FIG. 5 to the difference between the given incident illumination Ls (1E+5) and the incident illumination corresponding to the reference inflection point data VOK. The calculated ratio is supplied to the correction coefficient generator 44 in the form of a reference gradient signal âK. The reference gradient signal âK represents a reference gradient or slope of the sensor output characteristic curve K (FIG. 3) within the logarithmic function region which is common to all the photosensors 4 (FIG. 1) of the MOS image sensor 1.

The correction coefficient generator 44 has the function of a divider and is designed to calculate the ratio between the reference gradient signal âA supplied from the reference gradient calculation section 43 and the gradient signal âA supplied from the gradient calculation section 42. The calculated ratio (âK/âA) is supplied to the corrective calculation section 55 in the form of a correction coefficient signal âH.

The corrective calculation section 45 has the function of a multiplier and is designed to multiply the sensor output Vo supplied from the MOS image sensor 1 with the correction coefficient âH. A result of this multiplication (Vo×âH) is output from the corrective calculation section 45 in the form of a sensor correction output VH.

Because of the correcting device 40 including the logarithmic characteristic correction unit 41 arranged to correct the logarithmic characteristic of each photosensor on the basis of the reference inflection point data VOK and the offset data VOB within the logarithmic function region, the photosensor signal processing apparatus 5 can correct the sensor output such that within the Logarithmic function region, the individual sensor outputs of the photosensor 4 (FIG. 1) forming the MOS image sensor 1 are the same as the reference sensor output characteristic.

Figure 9:
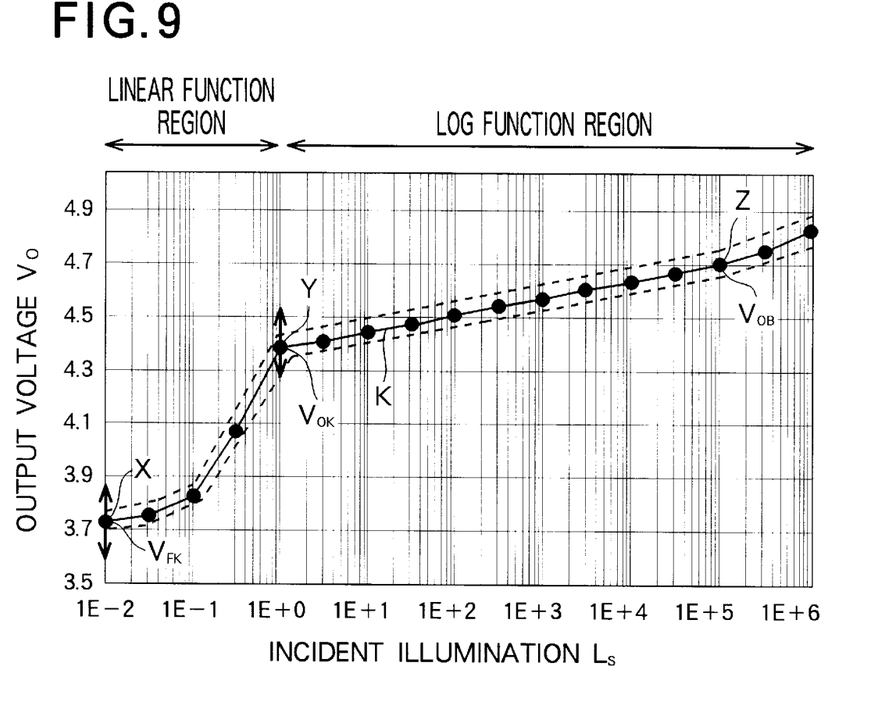
FIG. 9 is a graph similar to FIG. 3, showing the manner in which correction is performed by respective correcting devices shown in FIGS. 5, 6, 7 and 8.

FIG. 9 is a graph similar to FIG. 3, but showing the manner in which variations in output characteristic between photosensors 4 (FIG. 1) of the MOS image sensor 1 are corrected by the photosensor signal correcting apparatus 5 ((FIG. 5) according to the present invention.

Variations in inflection point data VA between the photosensors 4 of the MOS image sensor 1, which occur at point Y as indicated by arrows shown in FIG. 9, are corrected or canceled by the correcting device 6 shown in FIG. 5 such that the inflection point data VA of all the photosensors 4 are equal to the reference inflection point data VOK.

Additionally, variations in offset data VF between the photosensors 4 of the MOS image sensor 1, which occur at point X as indicated by arrows shown in FIG. 9, are corrected or canceled by the correcting device 20 shown in FIG. 6 such that the offset data VF of all the photosensors 4 are equal to the reference offset data VFK.

Furthermore, variations in gradient âA of the output characteristic curve between the photosensors 4 of the MOS image sensor 1, which are as indicated by a part of broken lines extending between the point X and the point Y (in the linear function region) shown in FIG. 9, are corrected or canceled by the correcting device 30 shown in FIG. 7 such that the gradients âA of characteristic curves of all the photosensors 4 the same as the reference gradient âK of the reference output characteristic curve K.

Additionally, variations in gradient âA of the output characteristic curve between the photosensors 4 of the MOS image sensor 1, which are as indicated by a part of broken lines extending between the point Y and the point Z (in the logarithmic function region) shown in FIG. 9, are corrected or canceled by the correcting device 40 shown in FIG. 8 such that the gradients âA of characteristic curves of all the photosensors 4 are the same as the reference gradient âK of the reference characteristic curve K.

Thus, these correcting devices 6, 20, 30 and 40 of the photosensor signal processing apparatus 5 can correct the inflection point variation, offset variation, linear characteristic variation and logarithmic characteristic variation in sensor output between photosensors 4 of the MOS image sensor 1, so that the individual sensor outputs of the photosensors have an output characteristic curve identical to the reference output characteristic curve K shown in FIG. 3.

Figure 10:
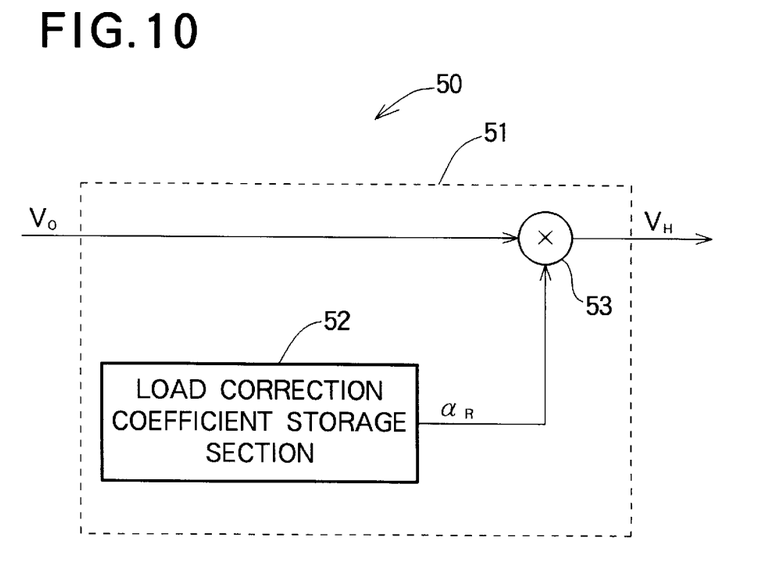
FIG. 10 is a block diagram showing a load correcting device for correcting load-dependent variations in the sensor output according to the present invention.
Figure 11:
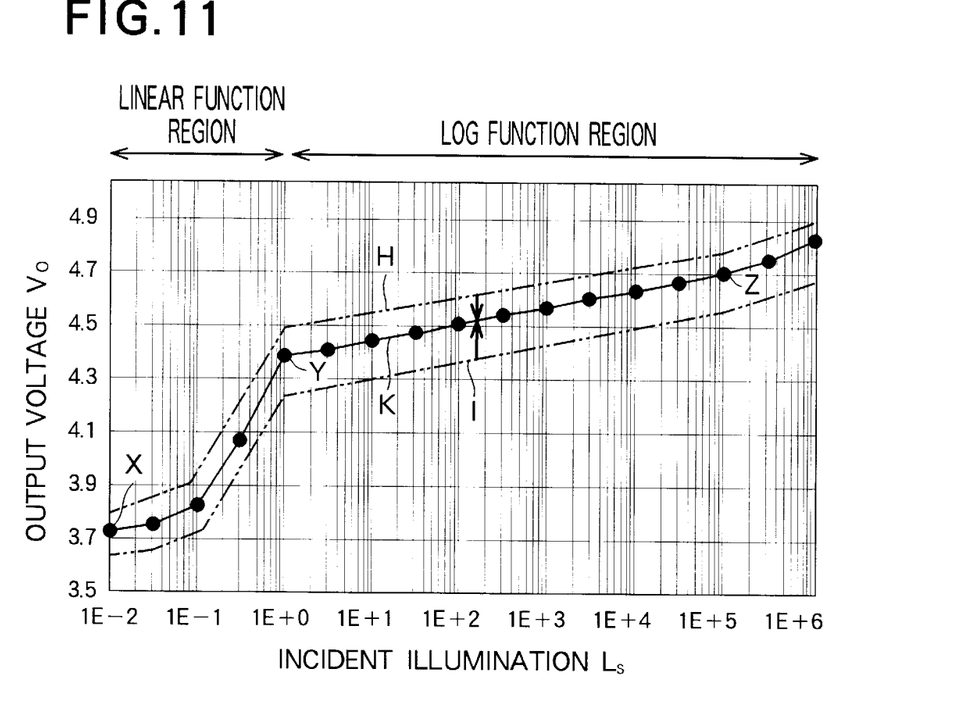
FIG. 11 is a graph similar to FIG. 3, showing the operation of the load correcting device of FIG. 10.

FIG. 10 shows a modified correcting device 50 including a load correcting means or unit 51 according to the present invention.

As shown in FIG. 10, the load correcting unit 51 includes a load correction coefficient storage means or section 52 and a corrective calculation means or section 53.

Each of the photosensors 4 (FIG. 1) has a load which is composed of the two n-channel MOS transistors Q2 and Q3 and the load resistance R, as shown in FIG. 2. Due to variations in characteristics of the transistors Q2, Q2 and load resistance R, respective sensor output characteristic curves of the photosensors 4 tend to deviate from the reference output characteristic curve K, as indicated by the phantom lines H and I shown in FIG. 10.

The load correction coefficient storage section 52 includes a memory such as a ROM and has the function of a divider. This section 52 pre-stores the ratio of a reference load RK to a load R of each of the photosensors 4 (FIG. 1) and is designed to supply the ratio (RK/R) to the corrective calculation section 53 as a load correction coefficient âR of each photosensor 4.

The corrective calculation section 53 has the function of a multiplier and perform multiplication of a sensor output Vo supplied from the MOS image sensor 1 (FIG. 1) with the load correction coefficient âR supplied from the load correction coefficient storage section 52. A result of multiplication (âR×Vo) is output from the corrective calculation section 53 in the form of a sensor correction output VH. With this multiplication of the sensor output Vo with the load correction coefficient âR, the sensor output characteristic curves H and I shown in FIG. 9 are corrected into the reference sensor output characteristic curve K.

Because of the correction device 50 including the load correction unit 51 capable of correcting variations in sensor output resulting from variations in load on the photosensors 4, the photosensor signal processing apparatus 5 can make the linear and logarithmic characteristics of output from the MOS image sensor 1 coincident with those of the reference sensor output characteristic curve K.

Figure 12:
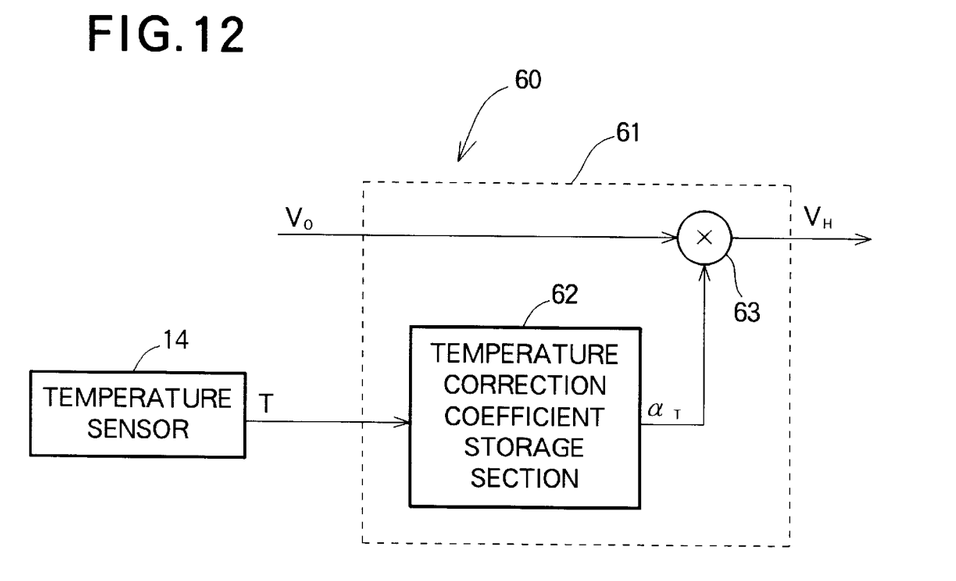
FIG. 12 is a block diagram showing a temperature compensating device for compensating temperature-dependent variations in the sensor output according to the present invention.

FIG. 12 shows in block diagram a modified correcting device 60 including a temperature compensating means or unit 61.

As shown in FIG. 12, the temperature compensating unit 61 is composed of a temperature correction coefficient storage means or section 62 and a corrective calculation means or section 63.

The temperature correction coefficient storage section 62 includes a memory such as a ROM and have the function of divider. This section 62 pre-stores the ratio between a reference temperature coefficient TK with respect to ambient temperature and a temperature coefficient TI of each photosensor 4 with respect to ambient temperature. A temperature sensor 14 detects ambient temperature of the MOS image sensor 1 (FIG. 1) and produces a temperature signal T corresponding to the detected ambient temperature. The temperature signal T is supplied to the temperature correction coefficient storage section 62. The temperature correction coefficient storage section 62 supplies the ratio (TK/TI) corresponding to the temperature signal T to the corrective calculation section 63 as a temperature correction coefficient âT.

The corrective calculation section 63 has the function of a multiplier and performs multiplication of a sensor output Vo supplied from the MOS image sensor 1 (FIG. 1) with the temperature correction coefficient aT supplied from the temperature correction coefficient storage section 62. A result of multiplication (aT×Vo) is output from the corrective calculation section 63 in the form of a sensor correction output VH. With this multiplication of the sensor output Vo with the temperature correction coefficient aT, the change in the sensor output Vo of each photosensor due to a variation in ambient temperature can be compensated.

As described above, because of the correcting device 60 including the temperature compensating unit 61 capable of compensating the change in the output of each photosensor due to a variation of ambient temperature, the photosensor signal processing apparatus 5 of the present invention can compensate for the change in the output of the MOS image sensor due to a variation of ambient temperature.

Obviously, various minor changes and modifications of the present invention are possible in the light of the above teaching. It is to be understood that within the scope of the appended claims the present invention may be practiced otherwise than as specifically described.

What is claimed is:

1. A photosensor signal processing apparatus for suppressing a fixed pattern noise resulting from variations in output characteristics between photosensors of an image sensor, each of the photosensors having a linear function region in which sensor output varies linearly with incident illumination, the photosensor signal processing apparatus comprising:

a correction data storage device which stores a set of correction data about the respective photosensors for the correction of individual output values of the photosensors; and a correcting device for correcting each of the individual output values of the photosensors on the basis of a corresponding data value from said set of correction data, so that said output values of the photosensors are equal to one another.

2. The photosensor signal processing apparatus according to claim 1, wherein said correction data storage device includes a reference inflection point setting device for setting data about a reference inflection point between the linear function region and the logarithmic function region, and an inflection point data storage device which stores therein a set of data about individual inflection points of the photosensors, and wherein said correcting device includes an inflection point corrective calculation device for performing at least one corrective calculation on the basis of the reference inflection point data and the set of inflection point data so that the individual inflection points of the photosensors match with the reference inflection point.

3. The photosensor signal processing apparatus according to claim 2, wherein said reference inflection point setting device is capable of setting the reference inflection point data at any given value.

4. The photosensor signal processing apparatus according to claim 1, wherein said correction data storage device includes a reference offset data storage device which stores therein data about a reference offset common to all of the photosensors, and an offset data storage device which stores therein a set of data about individual offsets of the photosensors, and wherein said correcting device includes an offset corrective calculation device for performing at least one corrective calculation on the basis of the reference offset data and the set of offset data so that the individual offsets of the photosensors match with the reference offset.

5. The photosensor signal processing apparatus according to claim 2, wherein said correction data storage device further includes a reference offset data storage device which stores therein data about a reference offset common to all of the photosensors, and an offset data storage device which stores therein a set of data about individual offsets of the photosensors, and wherein said correcting device includes an offset corrective calculation device for performing at least one corrective calculation on the basis of the reference offset data and the set of offset data so that the individual offsets of the photosensors match with the reference offset.

6. The photosensor signal processing apparatus according to claim 5, further including a linear characteristic correcting unit for correcting individual sensor outputs of the photosensors based on said reference offset data and said reference inflection point data so that within the linear function region, the individual sensor outputs have the same linear characteristics.

7. The photosensor signal processing apparatus according to claim 6, wherein said linear characteristic correcting unit includes a gradient calculation section for, on the basis of said offset data and said inflection point data, calculating respective gradients of characteristic curves of the individual sensor outputs of the photosensors within the linear function region, a reference gradient calculation section for, on the basis of said reference offset data and said reference inflection point data, calculating a reference gradient of a reference characteristic curve common to all the photosensors within the linear function region, a correction coefficient generator for generating a correction coefficient on the basis of each of said gradients and said reference gradient, and a corrective calculation section for performing multiplication of the sensor output of each of the photosensors with said correction coefficient, so that the characteristic curves of the individual sensor outputs mach with the reference characteristic curve within the linear function region.

8. The photosensor signal processing apparatus according to claim 5, further including a logarithmic characteristic correcting unit for correcting individual sensor outputs of the photosensors based on said reference inflection point data and data about a reference output at a given point within the logarithmic function region so that within the logarithmic function region, the individual sensor outputs have the same logarithmic characteristics.

9. The photosensor signal processing apparatus according to claim 8, wherein said logarithmic characteristic correcting unit includes a gradient calculation section for, on the basis of said inflection point data and the individual sensor outputs at said given point within the logarithmic region, calculating respective gradients of characteristic curves of the individual sensor outputs of the photosensors within the logarithmic function region, a reference gradient calculation section for, on the basis of said reference inflection point data and said reference output data, calculating a reference gradient of a reference characteristic curve common to all the photosensors within the logarithmic function region, a correction coefficient generator for generating a correction coefficient on the basis of each of said gradients and said reference gradient, and a corrective calculation section for performing multiplication of the sensor output of each of the photosensors with said correction coefficient, so that the characteristic curves of the individual sensor outputs mach with the reference characteristic curve within the logarithmic function region.

10. The photosensor signal processing apparatus according to claim 1, wherein said correction data storage device includes a load correction coefficient storage section which stores therein individual load correction coefficients of the photosensors, and wherein said correcting device corrects each of the individual output values of the photosensors on the basis of a corresponding one of said load correction coefficients, so that variations in output characteristic between the photosensors occurring due to variations in load of the photosensors are corrected.

11. The photosensor signal processing apparatus according to claim 1, wherein said correction data storage device includes a temperature correction coefficient storage section which stores therein individual temperature correction coefficients of the photosensors, and wherein said correcting device corrects each of the individual output values of the photosensors on the basis of a corresponding one of said temperature correction coefficients, so that variations in output characteristic between the photosensors occurring due to variations in temperature of the photosensors are compensated.

* * * * *

UNITED STATES PATENT AND TRADEMARK OFFICE
CERTIFICATE OF CORRECTION

| | |
|---|---|
| PATENT NO. | : 6,191,408 B1 |
| DATED | : February 20, 2001 |
| INVENTOR(S) | : Sukeyuki Shino Tsuka et al. |

It is certified that error appears in the above-identified patent and that said Letters Patent is hereby corrected as shown below:

<u>Title page,</u>
Item [73] Assignee should read as follows:
-- [73] Assignee: Honda Giken Kogyo Kabushiki Kaisha; Citizen Watch Co., Ltd., both of Tokyo, (JP) --.

Signed and Sealed this

First Day of January, 2002

Attest:

*Attesting Officer*

JAMES E. ROGAN
*Director of the United States Patent and Trademark Office*